Aug. 4, 1931.   P. TAUREL   1,817,111
MACHINE FOR CUTTING THREADS ON TUBES
Filed July 6, 1929   3 Sheets-Sheet 1

INVENTOR
Paulin Taurel
by
Attorney

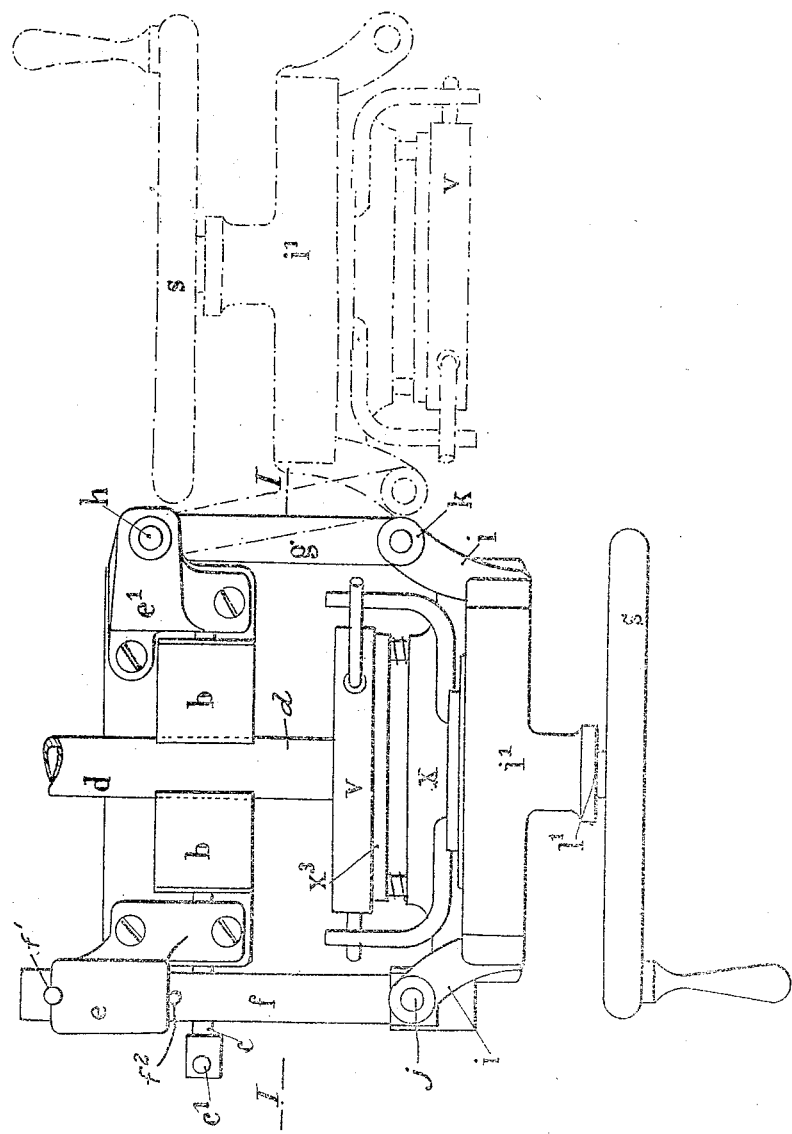

INVENTOR
Paulin Taurel
by
Attorney

Patented Aug. 4, 1931

1,817,111

UNITED STATES PATENT OFFICE

PAULIN TAUREL, OF ROMAINVILLE, FRANCE

MACHINE FOR CUTTING THREADS ON TUBES

Application filed July 6, 1929, Serial No. 376,376, and in France December 20, 1928.

In preparing tubes used in apparatus serving, for example, for central heating, the fitters have at their disposal a screwing machine with two or four arms, which is manipulated by two or three men, one of whom pushes against the die to cause it to take a grip of the end of the tube. This work is long and tedious.

Where it is decided to go the expense of transporting a screwing machine to the work, this transport is very expensive in view of the fact that existing machines are not practically dismountable.

The primary object of this invention is the provision of a machine for readily cutting threads on large tubes, said machine being adapted to be demounted or detached in component parts for transportation, each by a single individual.

Other objects of the invention are the provision of a machine for cutting threads which permits cutting of the thread and fitting of a coupling without removing the tube from the machine, eliminates manual guiding of the die at the start of the cutting operation and permits cutting any pitch or type of thread on the tube.

This machine comprises the following principal parts:

(a) A vise-like member holding the pipe to be threaded; (b) controlling gears of the screw stock, these gears being of two speeds and working by friction; (c) a gear case capable of swivelling after the manner of a grate door and enclosing the said gears and also the friction arrangement; (d) a spring pusher acting on the stock pressing this latter against the tube to be threaded in order to force the stock on the tube.

The friction arrangement mounted on the control avoids any breakage in consequence of undue force exerted on the handle.

Furthermore, the gearings are perfectly equalized from the point of view of the forces so as to do away with a large part of the friction.

This invention will be hereafter described, as an example with reference to the annexed drawing, in which:

Fig. 2 is a complete plan;

In these various figures, the same reference letters indicate the same parts.

Figure 1:
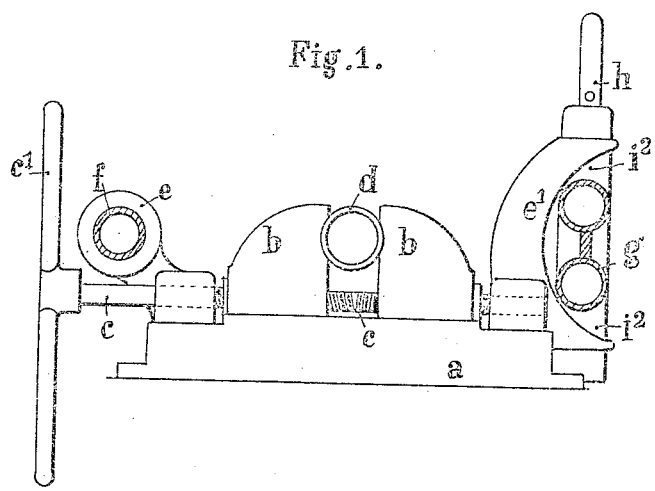
Fig. 1 is a cross section of the machine on the line I—I of Figure 2.
Figure 3:
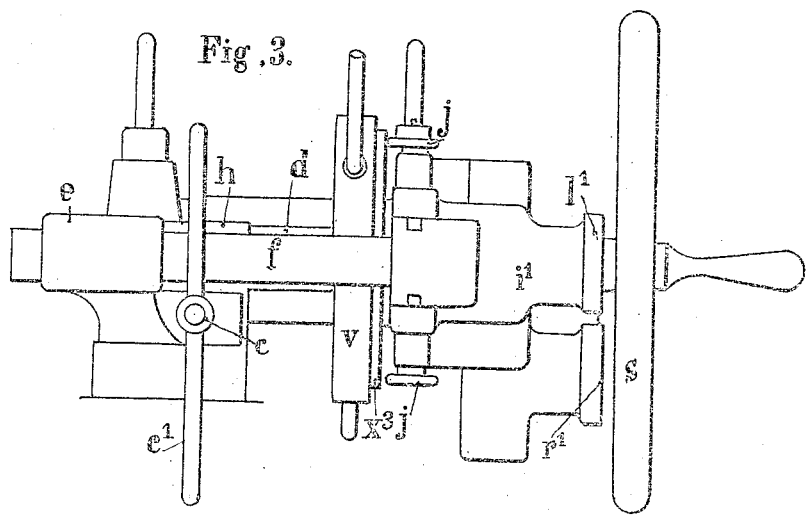
Fig. 3 is a side view.
Figure 8:
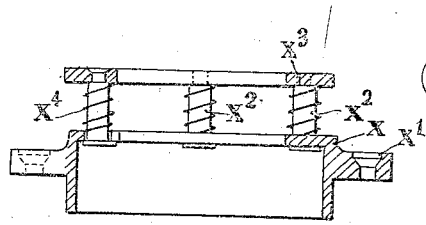
Fig. 8 is a horizontal section of the spring push used in this machine and having for its object to press the die against the tube which is to be screwed.
Figure 9:
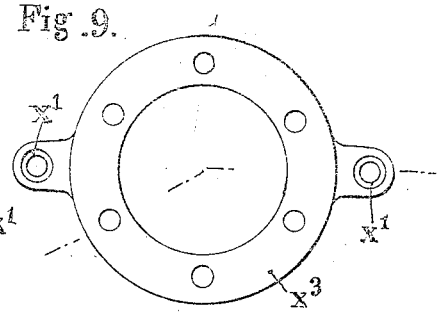
Fig. 9 shows a back end view of this same push.
Figure 4:
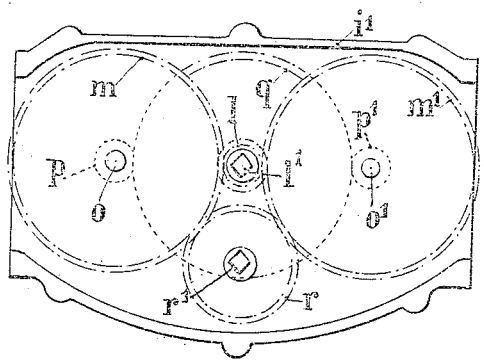
Fig. 4 is an end view of the case, the front plate being removed.
Figure 6:
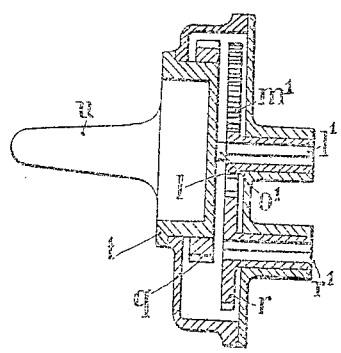
Fig. 6 is a section of the case through the axis of the machine.
Figure 5:
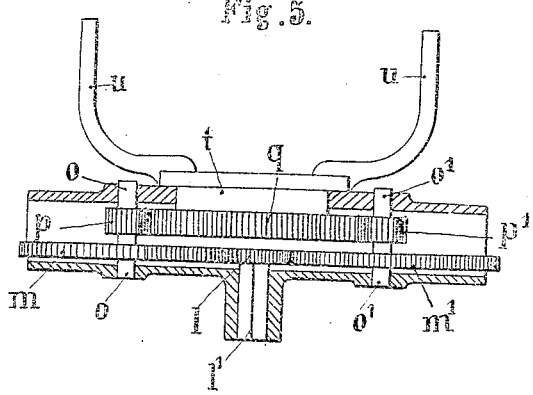
Fig. 5 shows the same case in horizontal section.

As will be seen on the drawing, this machine comprises a frame or base $a$ on which the two jaws $b$ of a vise are capable of sliding laterally, simultaneously and with the same displacement but in opposition directions one to the other under the action of a control cross thread $c$ in such manner as to clamp the tube $d$ to be threaded or to disengage it as desired. This screw, suitably carried, is threaded half right hand, and half left hand with the same pitch, and is manipulated by means of a double lever $c^1$ mounted thereon. In this manner the tube $d$ to be threaded is always held in the axis of the machine whatever may be the diameter of the tube.

On the two sides of the base $a$ and behind it are situated supports $e$ $e^1$ intended to receive on one side a sliding arm $f$, and on the other side a rod $g$.

The sliding arm $f$ is tubular, and its support forms a bush. The sliding arm $f$ has two pins $f'$ and $f^2$. Pin $f'$ is fixed and prevents arm $f$ from being extracted from the socket $e$; pin $f^2$ is in arm $f$ on the other side of bracket $e$, insures firm positioning of said arm and may be withdrawn to permit sliding arm $f$ to be moved back through socket $e$. The rod $g$ has a cross section in the form of two tubes connected in parallel by a vertical rib and is swivelled on its support $e^1$ forming an arc, by means of a vertical axle $h$.

In front, the arm $f$ and the connector $g$ support by means of two lugs $i$ the case $i^1$ containing the gears which rotate the stock.

The arm $f$ is connected to the said case $i^1$ by two vertically opposite bolts $j$, whilst the connector $g$ is attached to the same case by a verticle axle $k$.

The case $i^1$ contains two sets of parallel gears, the one controlling and the other controlled. These sets are perfectly equalized in order to suppress a large part of the friction.

For slow speed, a small central pinion $l$ is operated, and this actuates two large symmetrical pinions $m\ m^1$ actuating on their part, by means of their axle $o$, $o^1$ the set of controlled gears $p, p^1, q$.

For high speed a medium pinion $r$ is rotated, this actuating the two large pinions $m\ m^1$ which actuate in their turn, by means of their axle $o\ o^1$ the set of controlled gears $p\ p^1\ q$.

This change of speed is obtained directly by fitting the axle of the fly-wheel $s$ either in the barrel $l^1$ of the small pinion $l$ or in the barrel $r^1$ of the medium pinion $r$, these barrels being mounted in ball bearings.

Figure 7:
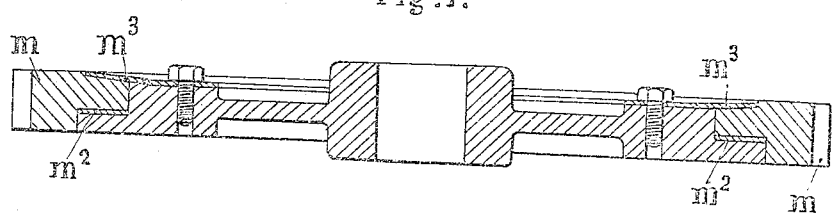
Fig. 7 is a detail in horizontal section of the friction arrangement applied to the control gears of the stock.

The large pinions $m\ m^1$ of the set of controlling gears each comprise a toothed wheel friction mounted at $m^2\ m^3$, Fig. 7, to avoid the breakage which might be caused by too great an effort exerted on the flywheel $s$.

The set of controlled gears comprises the two small symmetrical pinions $p\ p^1$, corresponding respectively to the large pinions $m\ m^1$ and mounted on the same axle.

The pinions $p\ p^1$ engage with the large central pinion $q$.

The large central pinion $q$ of the set of gears controlled is connected by a strong central journal $t$ with a fork $u$ intended to carry with it the stock $v$.

This stock is preferably provided with a chaser and arms, the latter abutting against the branches of the fork $u$ to carry it around.

The pusher interposed between the stock $v$ and the central journal $t$ includes a kind of sleeve $w$ provided with two bored lugs $x^1$ through which pass screws engaging in said journal.

This sleeve is provided with sliding studs $x^2$ connecting this part with a washer or ring $x^3$ which is subjected to the action of the spiral springs $x^4$. This ring, under the pressure of the springs $x^4$ forces the stock $v$ on to the tube to be threaded.

As the threading is effected by the turning of the flywheel $s$ the arms of the stock $v$ slide along the branches of the fork $u$.

The operation of the machine for cutting threads is as follows:

The tube $d$ is clamped between the jaws $b$ so that the end to be threaded is within the normally extended position of the stock $v$, the stock assembly now being in the position shown in dotted lines in Fig. 2. The stock assembly is then swung about vertical axle $k$ into the position shown in solid lines in Fig. 2, a slight pressure being exerted on the case $i^1$ to compress springs $x^4$ of the pusher so that bolts $j$ may be put in place. Rotation of the fly-wheel $s$ causes rotation of the stock $v$ and cutting of the thread on the tube $d$.

To make the machine adaptable for cutting off the end of tube $d$, the connector $g$ is hinged at axle $h$ so that the stock assembly can be swung back to unmask the whole projection of pipe $d$ beyond the jaws $b$. The sliding arm $f$ may also be pushed back after withdrawing pin $f^2$ so that the cutting of the tube will not be impeded.

All the parts comprised in this machine may be taken down in order to facilitate carriage. The parts can be fitted together again instantly without any difficulty.

The shapes, details, accessory parts, materials and dimensions of this machine may of course be varied.

What I claim is:

1. A machine for cutting threads on a tube comprising a case hingedly mounted, a gear train mounted in said case, driving gears of different size engaging said gear train, a fork actuated by said gear train, a die stock actuated by said fork and a push member resiliently urging said die stock on said tube.

2. A machine for cutting threads on a tube comprising a case hingedly mounted, a gear train mounted in said case, a central journal actuated by said gear train, a fork mounted on said journal, a die stock actuated by said fork and adapted to slide in an axial direction, a ring abutting said die stock, a sleeve attached to said journal and provided with holes, studs on said ring sliding in said holes and springs between said ring and said sleeve forcing the same apart.

3. A machine for cutting threads on a tube comprising a case hingedly mounted, a set of controlling gears and a set of controlled gears mounted in said case, two large pinion gears in said set of controlling gears, each comprising a center piece, a rim and friction means, a central journal actuated by said controlled gears, a fork mounted on said journal, a die stock actuated by said fork and adapted to slide in an axial direction, a ring abutting said die stock, a sleeve attached to said journal and provided with holes, studs on said ring sliding in said holes and springs between said ring and said sleeve forcing the same apart.

The foregoing specification of my "improved machine for cutting threads on tubes" signed by me this 24th day of June, 1929.

PAULIN TAUREL.